(12) United States Patent
Geile

(10) Patent No.: US 8,923,437 B2
(45) Date of Patent: Dec. 30, 2014

(54) NON-CONTIGUOUS SPECTRAL-BAND MODULATOR AND METHOD FOR NON-CONTIGUOUS SPECTRAL-BAND MODULATION

(71) Applicant: Raytheon BBN Technologies Corp., Cambridge, MA (US)

(72) Inventor: Michael Joseph Geile, Bastavia, OH (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 52 days.

(21) Appl. No.: 13/672,915

(22) Filed: Nov. 9, 2012

(65) Prior Publication Data

US 2013/0170584 A1    Jul. 4, 2013

Related U.S. Application Data

(60) Provisional application No. 61/581,248, filed on Dec. 29, 2011.

(51) Int. Cl.
*H03C 3/00* (2006.01)
*H04L 5/00* (2006.01)
*H04L 27/20* (2006.01)

(52) U.S. Cl.
CPC .......... *H04L 27/2053* (2013.01); *H04L 5/0041* (2013.01); *H04L 27/2017* (2013.01)
USPC ........... 375/302; 375/295; 375/296; 375/305; 375/316; 375/340

(58) Field of Classification Search
USPC ......... 375/270, 272, 286, 295, 296, 299, 300, 375/302, 306, 316, 322, 329, 339, 340, 342, 375/345, 350
See application file for complete search history.

(56) References Cited

U.S. PATENT DOCUMENTS

| | | | |
|---|---|---|---|
| 6,973,121 B1 * | 12/2005 | Eberlein et al. | 375/211 |
| 8,200,149 B1 * | 6/2012 | Chen | 455/12.1 |
| RE43,985 E * | 2/2013 | Vinton et al. | 704/225 |
| 8,654,730 B2 * | 2/2014 | Goto et al. | 370/329 |

(Continued)

OTHER PUBLICATIONS

"International Application Serial No. PCT/US2012/064307, International Search Report mailed Feb. 20, 2013", 4 pgs.

(Continued)

*Primary Examiner* — Hirdepal Singh
(74) *Attorney, Agent, or Firm* — Schwegman Lundberg & Woessner, P.A.

(57) ABSTRACT

Embodiments of a non-contiguous spectral-band modulator and method for non-contiguous spectral-band modulation are generally described herein. In some embodiments, an input symbol tuple may be mapped to a sequence of phase values. Each value of the sequence of phase values may represent an instantaneous frequency of a waveform for a signal with a power spectral density that is substantially constrained to the two or more subbands of a non-contiguous spectrum. The values of the sequence of phase values may be accumulated and a phase-sample sequence representing phase samples of a transmit waveform may be generated. An exponentiation may be performed on the phase-sample sequence to generate a constant modulus signal sequence. An output signal sequence is generated that is constrained to a region in the complex plane, such as an annulus, when the signal is in a subband. The output signal sequence may be shaped to constrain spectral energy during transitions between subbands.

20 Claims, 2 Drawing Sheets

(56) References Cited

U.S. PATENT DOCUMENTS

2004/0240378 A1* 12/2004 Kei Ng et al. ............... 370/206
2012/0218045 A1* 8/2012 Takagi et al. ............... 330/307
2012/0280749 A1* 11/2012 Kumar ......................... 330/149

OTHER PUBLICATIONS

"International Application Serial No. PCT/US2012/064307, Written Opinion mailed Feb. 20, 2013", 10 pgs.

Hamidian, K., "Closed-form of the power spectral density for full response M-ary CPFSK modulation", *IEEE Pacific Rim Conference on Communications, Computers and Signal Processing*, vol. 1, (1991), 182-186.

John, G., *Digital Communications*, 2nd Edition, (1989), 172-205; Doc: XP-002691717.

Stevens, M. L, et al., "A Near-Optimum Discriminator Demodulator for Binary FSK with Wide Tone Spacing", *IEEE Microwave and Guided Wave Letters*, vol. 3, No. 7, (1993), 227-229.

Svensson, T., et al., "Constrained Envelope Continuous Phase Modulation", *The 57th IEEE Semiannual Vehicular Technology Conference (VTC 2003—Spring)*, (Apr. 22, 2003), 2623-2627.

Svensson, T., et al., "Design and performance of constrained envelope continuous phase modulation", *2009 International Waveform Diversity and Design Conference*, (2009), 312-316.

* cited by examiner

NON-CONTIGUOUS SPECTRAL-BAND MODULATOR AND METHOD FOR NON-CONTIGUOUS SPECTRAL-BAND MODULATION

PRIORITY CLAIM

This application claims priority under 35 USC 119 to U.S. Provisional Patent Application Ser. No. 61/581,248, filed Dec. 29, 2011, which is incorporated herein by reference and made a part hereof.

GOVERNMENT RIGHTS

This invention was not made with Government support. The Government does not have certain rights in this invention.

TECHNICAL FIELD

Embodiments pertain to modulation techniques. Some embodiments pertain to information transmission over various media including both wired and wireless media. Some embodiments relate to the transmission of information in a non-contiguous spectrum composed of two or more non-contiguous frequency subbands.

BACKGROUND

It may be desirable to transmit information using more than one frequency band for increased data rate and/or improved quality and reliability. Due to spectrum availability, such frequency bands may be non-contiguous. One issue with the transmission of information over more than one non-contiguous frequency band is spectral growth. Spectral growth may result from non-linearities in the power amplifier used to amplify the signals for transmission and may result in increased signal content outside the desired frequency bands.

Thus, what is needed is a non-contiguous spectral-band modulator and method for non-contiguous spectral-band modulation that reduces and/or eliminates spectral growth. What is also needed is a non-contiguous spectral-band modulator and method for non-contiguous spectral-band modulation that allows the power amplifier to operate in a more linear range. Also needed is a wireless communication device for transmitting information within a non-contiguous spectrum and providing an increased data rate and/or improved quality and reliability.

SUMMARY

In accordance with some embodiments, an input symbol tuple may be mapped to a sequence of phase values. Each value of the sequence of phase values may represent an instantaneous frequency of a waveform for a signal with a power spectral density that is substantially constrained to a non-contiguous spectrum. The values of the sequence of phase values may be accumulated and a phase-sample sequence representing phase samples of a transmit waveform may be generated. An exponentiation may be performed on the phase-sample sequence to generate a constant modulus signal sequence. In some embodiments, the constant modulus signal sequence may be multiplied by a weighting sequence to generate an output signal sequence. The output signal sequence may be constrained to a region in the complex plane. In some embodiments, the constant modulus signal sequence may be filtered to further constrain the output signal sequence to the non-contiguous spectrum to generate an output signal sequence.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
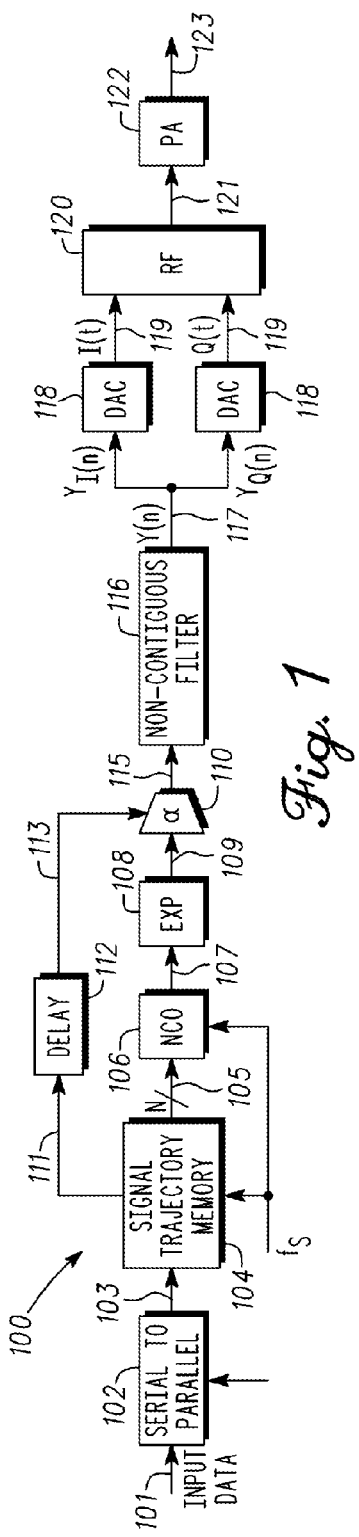
FIG. 1 illustrates a non-contiguous spectral-band modulator, in accordance with some embodiments.

FIG. 1 illustrates a non-contiguous spectral-band modulator, in accordance with some embodiments. The non-contiguous spectral-band modulator 100 may be configured for transmitting a waveform within a non-contiguous spectrum. In some embodiments, the non-contiguous spectral-band modulator 100 may include a signal-trajectory memory 104 to map an input symbol tuple 103 to a sequence of phase values 105 ($\phi(n)$). Each value of the sequence of phase values 105 may represent an instantaneous frequency of a waveform for a signal with a power spectral density (PSD) that is substantially constrained to the non-contiguous spectrum. The non-contiguous spectral-band modulator 100 may also include a numerically-controlled-oscillator (NCO) component 106 to accumulate the values of the sequence of phase values 105 and to generate a phase-sample sequence ($\theta(N)$) 107 representing phase samples of a transmit waveform. The non-contiguous spectral-band modulator 100 may also include a complex exponential (EXP) element 108 to perform an exponentiation on the phase-sample sequence 107 and to generate a constant modulus signal sequence 109. The non-contiguous spectral-band modulator 100 may also include a variable gain component 110 to multiply the constant modulus signal sequence 109 by a weighting sequence 113 and generate an output signal sequence 115. The output signal sequence 115 may be substantially constrained to a region in the complex plane while in a subband and have a controlled trajectory during subband transitions.

In accordance with embodiments, a weighting function that is implemented by the weighting sequence 113 may be configured to scale the output signal sequence 115 so that it is constrained to a region of the complex plane (such as an annulus) while within one of the subbands. The weighting function that is implemented by weighting sequence 113 may also be configured to scale the output signal sequence 115 to a small amplitude (which may transition to zero or near zero) when the signal transitions from one subband to another subband (i.e., between the non-contiguous subbands).

In these embodiments, the output signal sequence 115 may be used to generate a radio-frequency (RF) signal with reduced spectral content, which is substantially constrained within a non-contiguous spectrum for subsequent transmission. In this way, a spectrally-constrained waveform that uses multiple subbands can be generated with the use of single transmitter. The use of a non-contiguous spectrum may support increased data rates and/or increased reliability. Furthermore, the output signal sequence 115 may be configured to constrain the signal to a quasi-linear region of a transmitter's power amplifier operating curve while the signal is in a subband and to attain small signal values in a controlled manner during subband transitions to support spectral containment.

As used herein, references to a signal (such as output signal sequence 115) being in a subband refer to the situation when the signal is not transitioning between subbands and is substantially constrained to a particular subband (e.g., at least a predetermined percent (e.g., 80%) of the energy) is contained within the subband).

Figure 2:
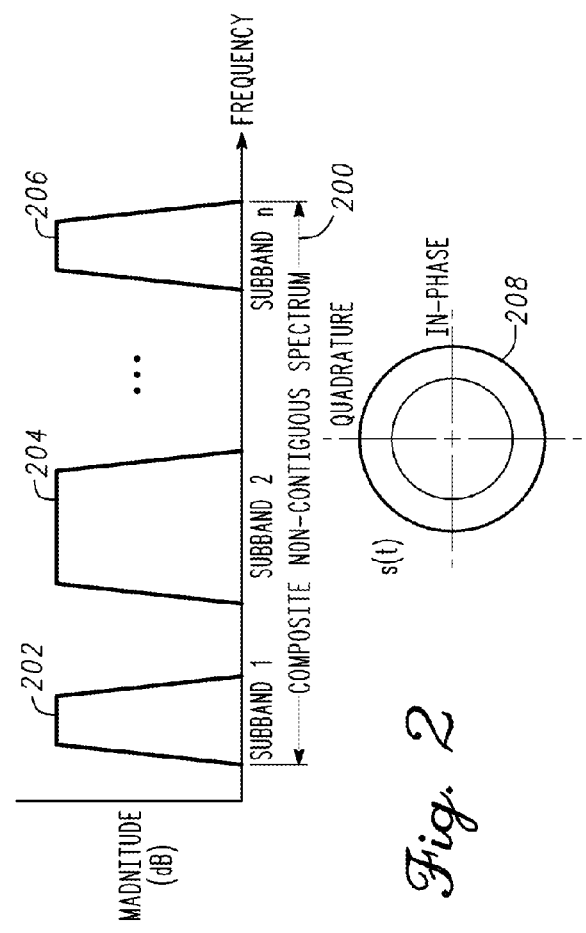
FIG. 2 illustrates subbands of a non-contiguous spectrum and a region of the complex plane in which an output signal sequence may be constrained while in a subband, in accordance with some embodiments.

FIG. 2 illustrates subbands of a non-contiguous spectrum and a region of the complex plane in which an output signal sequence may be constrained while in a subband, in accordance with some embodiments. The non-contiguous spectral-band modulator 100 (FIG. 1) may be configured for transmitting a waveform that uses the subbands of a non-contiguous spectrum 200. In these embodiments, the sequence of phase values 105 (FIG. 1) may represent the instantaneous frequency of a waveform for a signal with PSD that is substantially constrained to subbands of a non-contiguous spectrum (e.g., subbands 202, 204, 206). In these embodiments, the output signal sequence 115 (FIG. 1) may be substantially constrained to a region in the complex plane, such as region 208 while within one of the subbands, and with values near zero (e.g., in the interior of 208) during transitions between non-contiguous subbands. In these embodiments, the output signal sequence 115 may be either constrained to a region in the complex plane, or amplitude shaping may be controlled, to smoothly reduce the signal amplitude when leaving a subband or to smoothly increase the signal amplitude when entering a subband.

Referring back to FIG. 1, the constant modulus signal sequence 109 (FIG. 1) may comprise complex in-phase (I) and quadrature-phase (Q) components. The output signal sequence 115 may comprise I and Q components in a digitally sampled form that are constrained to a region in the complex plane, such as an annulus as illustrated as region 208, while operating in a non-contiguous subband and attaining small amplitudes, such as interior to the region 208, when transitioning between non-contiguous subbands. These embodiments are discussed in more detail below.

In some embodiments, the signal-trajectory memory 104 may provide the sequence of phase values 105 to the NCO component 106 from a plurality of phase-value sequences stored in the signal-trajectory memory 104. The symbol tuple 103 may select the sequence of phase values 105 from the signal-trajectory memory 104.

In some embodiments, the signal-trajectory memory 104 may be configured to generate a weighting sequence W(n) 111 as selected by the input symbol tuple 103. The variable gain component 110 may multiply the constant modulus signal sequence 109 by a delayed version of the weighting sequence 113. The application of a delayed version of the weighting sequence 113 by the variable gain component 110 may shape the amplitude of the constant modulus signal sequence 109 to a constrained region of the complex plane while also substantially constraining the signal to the non-contiguous spectrum. In some embodiments, the weighting sequence W(n) 111 may comprise a sequence of amplitude weighting values that are selected by the input symbol tuple 103.

In some embodiments, the non-contiguous spectral-band modulator 100 may include delay component 112 to delay the weighting sequence 111 by a delay amount approximately equal to a signal processing delay of the NCO component 106 and the complex exponential element 108. The use of the delay component 112 allows the variable gain component 110 to multiply the constant modulus signal sequence 109 by the weighting sequence 113 generated by the same signal trajectory sequence value (W(n), φ(n)) from the signal-trajectory memory 104. By multiplying the constant modulus signal sequence 109 by the weighting sequence 113, spectral content may be reduced from outside a subband of the non-contiguous spectrum.

As discussed above, the output signal sequence 115 may be constrained to the region 208 in the complex plane while operating in a subband. In some embodiments, the constrained region of the complex plane may comprise an annulus region as illustrated in FIG. 2, although this is not a requirement as the components of the output signal sequence 115 may be constrained to other types of regions in the complex plane.

In some embodiments, the sequence of phase values 105 provided by the signal-trajectory memory 104 may be samples of a selected phase pulse. In some embodiments, the signal-trajectory memory 104 may store signal trajectories rather than samples of pulses. In some alternate embodiments, the signal-trajectory memory 104 may be a pulse memory and store samples representative of pulses.

Figure 3:
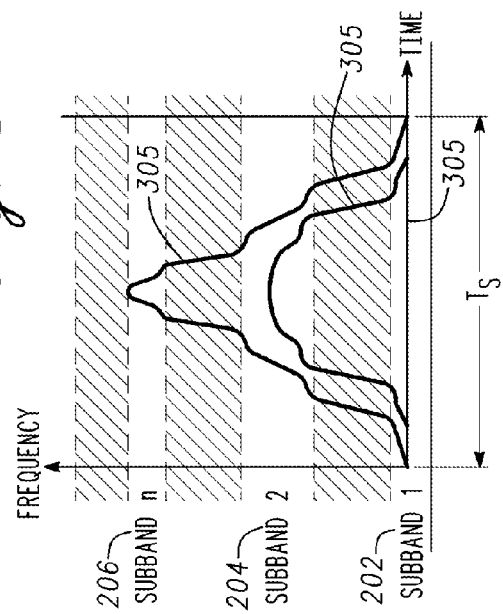
FIG. 3 illustrates examples of phase pulses, in accordance with some embodiments.

FIG. 3 illustrates examples of pulses, in accordance with some embodiments. Pulses 305 may correspond to phase values, which may be stored in the signal-trajectory memory 104. Each pulse 305 may have a well-defined area and a pulse width. In the example illustrated, the PSD of the pulses 305 may be restricted to a subband of the non-contiguous spectrum, such as subbands 202, 204, and 206 (FIG. 2).

In some embodiments, the signal-trajectory memory 104 may contain samples that represent sample phase values. In some embodiments, pulses, such as pulses 305, may be sampled to create values that are stored in the signal-trajectory memory 104. In these embodiments, signal amplitude may also be sampled and the amplitude W(n) (of weighting sequence 111) and the phase φ(n) samples (of the phase values 105) together (W(n), φ(n)) may represent a polar-signal trajectory that is converted to the I and Q components of the non-contiguous signal sequence 115, although the scope of the embodiments is not limited in this respect.

In some embodiments, the non-contiguous spectral-band modulator 100 may include a serial-to-parallel component 102 to receive an input data sequence 101 in serial form and convert it to parallel form to provide the input symbol tuple 103. In some embodiments, the input data sequence 101 may be received at a bit rate and the serial-to-parallel component 102, operating as an m-ary latch, may produce symbols at a symbol rate.

In some embodiments, the input symbol tuple 103 may be a collection of symbol values in parallel form. In some embodiments, the input symbol tuple 103 may be a collection of m-ary symbol values in parallel form. For example, for quadrature phase-shift keyed (QPSK) modulation, there are four points, and the modulation symbol values may be selected from a set of four defined values.

In some embodiments, the sequence of phase values 105 provided by the signal-trajectory memory 104 may be arranged to cause the NCO component 106 to establish a well-defined phase trajectory, which is converted to a Cartesian format by operation of the complex exponential element 108 to provide the constant modulus signal sequence 109 to the variable gain component 110. In these embodiments, the variable gain component 110 may modify the constant modulus signal sequence 109 by companion weighting values of weighting sequence 113 where the combined phase and amplitude of the output signal sequence 115 specify a signal trajectory with frequency content that is substantially constrained to the non-contiguous spectrum.

In some embodiments, the non-contiguous spectral-band modulator 100 may also include a filter 116 having a passband that includes the subbands of the non-contiguous spectrum (e.g., subbands 202, 204, and 206). The filter 116 may further constrain the output signal sequence 115 to the subbands of the non-contiguous spectrum (e.g., subbands 202, 204, and 206). In some embodiments, the filter 116 may be optional as the output signal sequence 115 may already be substantially constrained to the subbands of the non-contiguous spectrum (e.g., subbands 202, 204, and 206). In embodiments that include filter 116, the filter 116 may remove additional spectral content from outside the subbands.

In some embodiments, each value of the sequence of phase values 105 may represent an instantaneous frequency of a waveform for a signal with PSD in which at least 80% of the energy may be within the subbands of the non-contiguous spectrum, although the scope of the embodiments is not limited in this respect.

In some embodiments, the signal-trajectory memory 104 may be configured to provide the sequence of phase values 105 to the NCO component 106 at a clock rate ($f_s$). The NCO component 106 may operate at least at the clock rate ($f_s$).

In some embodiments, the NCO component 106 may operate at the clock rate ($f_s$), although this is not a requirement. In some other embodiments, the NCO component 106 operates at a rate that is greater than the clock rate. In these embodiments, the phase and amplitude values (that comprise the sequence of phase values 105 and the weighting sequence 111) at the output of the signal-trajectory memory 104 may be interpolated, which may reduce memory storage requirements. Some embodiments may use mappings other than those provided by the signal-trajectory memory 104, thereby allowing the sample rate after the signal-trajectory memory 104 to be greater than the rate at which samples are taken from the signal-trajectory memory 104.

In some embodiments, the clock rate ($f_s$) may be referred to as a sample clock rate, although the scope of the embodiments is not limited in this respect. In some embodiments, the NCO component 106 may integrate the sequence of phase values 105 at a rate that is at least as great as the sample clock rate.

In some embodiments, the non-contiguous spectral-band modulator 100 may also include digital-to-analog conversion (DAC) components 118 to convert the output signal sequence 115 to I and Q analog baseband signals 119, and RF circuitry 120 to up-convert the I and Q analog baseband signals 119 to RF signals 121. Due to the configuration of the output signal sequence 115, the RF signals 121 may be substantially constrained to the subbands of the noncontiguous spectrum (e.g., subbands 202, 204, and 206) (FIG. 2).

Although some embodiments are described herein with respect to modulation using signal representations in Cartesian coordinates, the scope of the embodiments is not limited in this respect as other modulation techniques and digital formats and signal mapping techniques may be used. In some other embodiments, polar modulation techniques are used. In other embodiments, the signal maybe converted to a real valued bandpass signal in the discrete domain and mixed to RF after conversion to an analog signal.

In some embodiments, a reconstruction filter may be included in-between each DAC component 118 and the RF circuitry 120, although the scope of the embodiments is not limited in this respect. In these embodiments, the reconstruction filters may operate as an anti-imaging filter and may be used to construct a smooth analog signal from a discrete sampled signal input.

In some embodiments, the non-contiguous spectral-band modulator 100 may also include a power amplifier (PA) 122 to amplify the RF signals 121 and generate an output RF signal 123 for transmission. In these embodiments, the output signal sequence 115 may be substantially constrained to the two or more non-contiguous spectral-bands (e.g., subbands 202, 204, 206), and the signal may stay in a constrained region of the operating curve of the power amplifier 122 (e.g., for class C operation) while in a subband. The amplifier's operating curve and degree of spectral containment, (i.e., degree to which out-of-band energy is attenuated) help determine the shape of the region 208 of the complex plane and characteristic of the output signal sequence 115 when transitioning between subbands.

In these embodiments, the RF output signal 123 may be substantially constrained to subbands of the non-contiguous spectrum (e.g., subbands 202, 204, 206), and the PA 122 may operate within a constrained region of its operating curve while in a subband and smoothly shape the amplitude during subband transitions (e.g., for class-C amplifier operation). Accordingly, the non-linearities of the PA 122 are substantially avoided, and spectral growth of the output signal 124 may thereby be reduced. In these embodiments, by the proper generating of the output signal sequence 115, the RF output signal 123 can be localized to a region of the operating curve of the PA 122 to substantially constrain the signal to the non-contiguous spectrum. Embodiments may also be applicable to other types of amplifier operations. For example, in some other embodiments, rather than an annulus region, the output signal sequence 115 may be restricted to a disk-shaped region for Class-A amplifier operation.

In accordance with some embodiments, the non-contiguous spectral-band modulator 100 may reduce and/or eliminate spectral growth. In accordance with some embodiments, the non-contiguous spectral-band modulator 100 may allow the PA 122 to operate in a more linear range while the signal is in a subband. In accordance with some embodiments, the non-contiguous spectral-band modulator 100 may be configured for transmitting information within a non-contiguous spectrum, thereby providing an increased data rate and/or improved quality and reliability while allowing the power amplifier to operate in a more linear range to reduce spectral growth.

In some embodiments, the output signal 123 may be transmitted by a single antenna, while in other embodiments, the output signal 123 may be transmitted by more than one antenna. The one or more antennas may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used.

Unlike conventional frequency-hopping spread-spectrum (FHSS) transmissions in which frequencies are changed while the signal is attenuated at the edge of a communications burst to constrain the spectrum, embodiments of the non-contiguous spectral-band modulator 100 use a tuple of information symbols to select a shaped signal trajectory that is substantially constrained to the non-contiguous spectrum. Unlike the non-contiguous application of orthogonal frequency division multiplexed (OFDM) signals that enable subcarriers in the subbands of the non-contiguous spectrum and disable subcarriers outside the non-contiguous subbands to realize a signal with an approximately zero-mean Gaussian distributed signal that is spectrally constrained to a non-contiguous spectrum, embodiments of the non-contiguous spectral-band modulator 100 control the signal trajectory so that the signal either operates in a linear region of the power amplifier's operating characteristic or transitions with small amplitudes in a controlled manner during subband transitions to jointly achieve improved non-contiguous spectral containment.

Although the non-contiguous spectral-band modulator 100 (FIG. 1) is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of modulator 100 may refer to one or more processes operating on one or more processing elements.

Embodiments of the non-contiguous spectral-band modulator 100 may also be implemented as part of a wireless device. Embodiments of the non-contiguous spectral-band modulator 100 may also be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, non-contiguous spectral-band modulator 100 may include one or more processors and may be configured with instructions stored on a computer-readable storage device.

Figure 4:
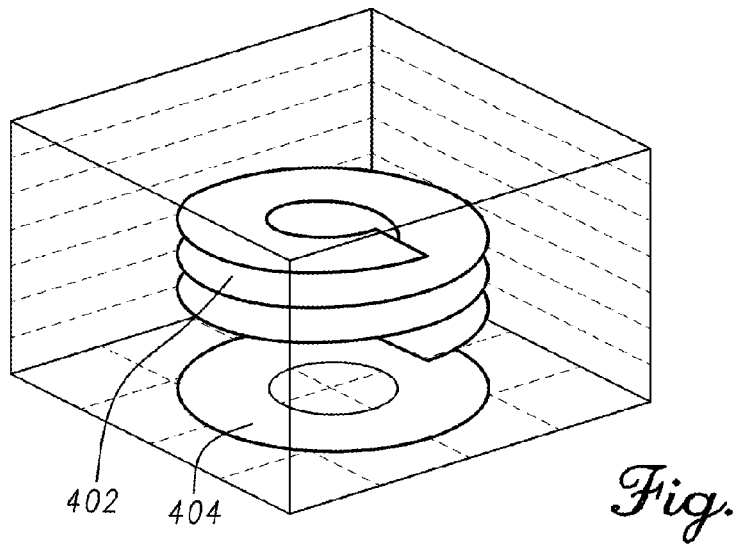
FIG. 4 illustrates covering space for an annulus, in accordance with some embodiments.

FIG. 4 illustrates covering space for an annulus, in accordance with some embodiments. As illustrated in FIG. 4, the portion of the signal that is in any subband may be created on a three-dimensional spiral 402 in the signal trajectory memory 104 (FIG. 1), projected onto a two-dimensional annulus 404, and then mapped by weighting the constant modulus values 110 (FIG. 1). Signal transitions between subbands may be shaped to attain small signal values (e.g., values that lie interior to the annulus 404).

Figure 5:
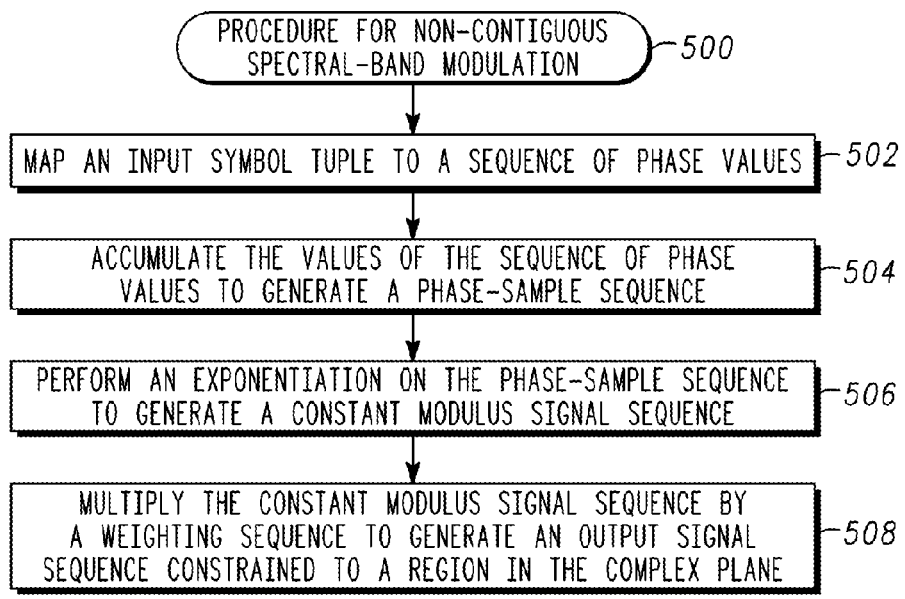
FIG. 5 is a procedure for non-contiguous spectral-band modulation, in accordance with some embodiments.

FIG. 5 is a procedure for non-contiguous spectral-band modulation, in accordance with some embodiments. Procedure 500 may be performed by a non-contiguous spectral-band modulator, such as non-contiguous spectral-band modulator 100, although this scope of the embodiments is not limited in this respect as other configurations may be used to perform procedure 500.

Operation 502 comprises mapping an input symbol tuple 103 (FIG. 1) to a sequence of phase values 105 (FIG. 1). Each value of the sequence of phase values 105 may represent an instantaneous frequency of a waveform for a signal with a PSD that is substantially constrained to the non-contiguous spectrum.

Operation 504 comprises accumulating the values of the sequence of phase values 105 and to generate a phase-sample sequence 107 (FIG. 1) representing phase samples of a transmit waveform.

Operation 506 comprises performing an exponentiation on the phase-sample sequence 107 to generate a constant modulus signal sequence 109 (FIG. 1).

Operation 508 comprises multiplying the constant modulus signal sequence 109 by a weighting sequence 113 to generate an output signal sequence 115 (FIG. 1). The output signal sequence 115 may be constrained to an annulus region 208 (FIG. 2) in the complex plane or through the interior of the annulus in a controlled manner during transitions between subbands.

Some embodiments may be implemented with an FPGA or FPGA circuitry. In these embodiments, the FPGA circuitry may be configured to map an input symbol tuple 103 to a sequence of phase values 105 such that each value of the sequence of phase values 105 represents an instantaneous frequency of a waveform for a signal with a PSD substantially constrained to the non-contiguous spectrum. The FPGA circuitry may also be configured to accumulate the values of the sequence of phase values 105 to generate a phase-sample sequence 107 representing phase samples of a transmit waveform. The FPGA circuitry may also be configured to perform an exponentiation on the phase-sample sequence 107 and to generate a constant modulus signal sequence 109.

In these FPGA embodiments, the FPGA circuitry may also be configured to multiply the constant modulus signal sequence 109 by a weighting sequence 113 to generate an output signal sequence 115. The output signal sequence 115 is constrained to a region 208 in the complex plane or may operate in the interior of the region 208 during controlled transitions between non-contiguous subbands. The output signal sequence 115 may be filtered to further constrain the output signal sequence 115 to the non-contiguous spectrum to generate an output signal sequence 117.

In some embodiments, the FPGA circuitry may be configured to perform the operations of the signal-trajectory memory 104, the NCO component 106, the complex exponential element 108, the variable gain component 110, and the delay component 112. In some embodiments, the FPGA circuitry may be configured to perform the operations of the serial-to-parallel component 102. In some embodiments, the FPGA circuitry may also be configured to perform the operations of the non-contiguous filter 116.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A non-contiguous spectral-band modulator configured to transmit a single waveform to traverse two or more subbands of a non-contiguous spectrum, the modulator comprising:

a signal-trajectory memory to map an input symbol tuple to a sequence of phase values, each value of the sequence of phase values representing an instantaneous frequency of the waveform for a signal with a power spectral density that is substantially constrained to a current one of the two or more subbands of the non-contiguous spectrum;

a numerically-controlled-oscillator (NCO) component to accumulate the values of the sequence of phase values and to generate a phase-sample sequence representing phase samples of the waveform;

a complex exponential element to perform an exponentiation on the phase-sample sequence and to generate a constant modulus signal sequence; and a variable gain component to multiply the constant modulus signal sequence by a weighting sequence to generate an output signal sequence corresponding to the waveform, the output signal sequence being constrained spectrally to a region in a complex plane while in one of the two or more subbands and having a controlled signal trajectory during transitions between the two or more subbands.

2. The non-contiguous spectral-band modulator of claim 1, wherein the signal-trajectory memory is to provide the sequence of phase values to the NCO component from a plurality of phase-value sequences stored in the signal-trajectory memory, and wherein the symbol tuple selects the sequence of phase values from the signal-trajectory memory.

3. The non-contiguous spectral-band modulator of claim 2, wherein the signal-trajectory memory is to further generate the weighting sequence as selected by the input symbol tuple, wherein application of the weighting sequence by the variable gain component is to shape an amplitude of the constant modulus signal sequence to a constrained region of the complex plane while in a subband and is to transition the constant modulus signal sequence to zero or near zero during transitions between subbands.

4. The non-contiguous spectral-band modulator of claim 3, further comprising a delay component to delay the weighting sequence by a delay amount approximately equal to a signal processing delay of the NCO component and the complex exponential element.

5. The non-contiguous spectral-band modulator of claim 1, further comprising a filter having a pass-band that includes the subbands of the non-contiguous spectrum, the filter to further constrain the output signal sequence to the non-contiguous spectrum.

6. The non-contiguous spectral-band modulator of claim 1 wherein the signal-trajectory memory is to provide the sequence of phase values to the NCO component at a clock rate, and wherein the NCO component operates at least at the clock rate.

7. The non-contiguous spectral-band modulator of claim 1, further comprising:

digital-to-analog conversion components to convert the output signal sequence to I and Q analog baseband signals;

radio-frequency circuitry to up-convert the I and Q analog baseband signals to RF signals, the RF signals being substantially constrained to the non-contiguous spectrum; and a power amplifier to amplify the RF signals and generate an output RF signal for transmission.

8. The non-contiguous spectral-band modulator of claim 7, wherein the RF output signal is substantially constrained to the non-contiguous spectrum, and wherein the PA is to operate within a constrained region of its operating curve for class-C operation.

9. A non-contiguous spectral-band modulator for transmitting a waveform within two or more subbands of a non-contiguous spectrum, the modulator comprising:

a signal-trajectory memory to map an input symbol tuple to a sequence of phase values, each value of the sequence of phase values representing an instantaneous frequency of a waveform for a signal with a power spectral density that is substantially constrained to the non-contiguous spectrum;

a numerically-controlled-oscillator (NCO) component to accumulate the values of the sequence of phase values and to generate a phase-sample sequence representing phase samples of a transmit waveform;

a complex exponential element to perform an exponentiation on the phase-sample sequence and to generate a constant modulus signal sequence; and a variable gain component to multiply the constant modulus signal sequence by a weighting sequence to generate an output signal sequence, the output signal sequence being constrained to a region in a complex plane while in a subband or having a controlled signal trajectory durin. transitions between subbands wherein the signal-trajectory memory is to provide the sequence of phase values to the NCO component from a plurality of phase-value sequences stored in the signal-trajectory memory, wherein the symbol tuple selects the sequence of phase values from the signal-trajectory memory, wherein the signal-trajectory memory is to further generate the weighting sequence as selected by the input symbol tuple, wherein application of the weighting sequence by the variable gain component is to shape an amplitude of the constant modulus signal sequence to a constrained region of the complex plane while in a subband and is to transition the constant modulus signal sequence to zero or near zero during transitions between subbands, and wherein the constrained region of the complex plane comprises an annulus region.

10. A non-contiguous spectral-band modulator for transmitting a waveform within two or more subbands of a non-contiguous spectrum, the modulator comprising:

a signal-trajectory memory to map an input symbol tuple to a sequence of phase values, each value of the sequence of phase values representing an instantaneous frequency of a waveform for a signal with a power spectral density that is substantially constrained to the non-contiguous spectrum;

a numerically-controlled-oscillator (NCO) component to accumulate the values of the sequence of phase values and to generate a phase-sample sequence representing phase samples of a transmit waveform;

a complex exponential element to perform an exponentiation on the phase-sample sequence and to generate a constant modulus signal sequence; and a variable gain component to multiply the constant modulus signal sequence by a weighting sequence to generate an output signal sequence, the output signal sequence being constrained to a region in a complex plane while in a subband or having a controlled signal trajectory during transitions between subbands, wherein the signal-trajectory memory is to provide the sequence of phase values to the NCO component from a plurality of phase-value sequences stored in the signal-trajectory memory, wherein the symbol tuple selects the sequence of phase values from the signal-trajectory memory, wherein the signal-trajectory memory is to further generate the weighting sequence as selected by the input symbol tuple, wherein application of the weighting sequence by the variable gain component is to shape an amplitude of the constant modulus signal sequence to a constrained region of the complex plane while in a subband and is to transition the constant modulus signal sequence to zero or near zero during transitions between subbands, and wherein the sequence of phase values provided by the signal-trajectory memory is arranged to cause the NCO to establish a phase trajectory which is converted to a Cartesian format by operation of the complex exponential element to provide the constant modulus signal sequence to the variable gain component.

11. A method for generating a single waveform to traverse two or more subbands of a non-contiguous spectrum, the method comprising:

selecting, with an input symbol tuple, a sequence of phase values, each value of the sequence of phase values representing an instantaneous frequency of the waveform for a signal with a power spectral density substantially constrained to a current one of the two or more subbands of the non-contiguous spectrum;

accumulating the values of the sequence of phase values to generate a phase-sample sequence representing phase samples of the waveform;

performing an exponentiation on the phase-sample sequence to generate a constant modulus signal sequence; and multiplying the constant modulus signal sequence by a weighting sequence to generate an output signal sequence corresponding to the waveform to cause the output signal sequence to be constrained spectrally to a region in a complex plane while in one of the two or more subbands and to have a controlled signal trajectory during transitions between the two or more subbands.

12. The method of claim 11, further comprising providing the sequence of phase values from a plurality of stored phase-value sequence, and wherein the symbol tuple selects the sequence of phase values.

13. The method of claim 12, further comprising:

generating a weighting sequence as selected by the input symbol tuple; and shaping an amplitude of the constant modulus signal sequence to a constrained region of the complex plane while in a subband; and transitioning the constant modulus signal sequence to zero or near zero during transitions between subbands.

14. A method for generating a waveform for transmission within two or more subbands of a non-contiguous spectrum, the method comprising selecting, with an input symbol tuple, a sequence of phase values, each value of the sequence of phase values representing an instantaneous frequency of a waveform for a signal with a power spectral density substantially constrained to the non-contiguous spectrum;

accumulating the values of the sequence of phase values to generate a phase-sample sequence representing phase samples of a transmit waveform;

performing an exponentiation on the phase-sample sequence to generate a constant modulus signal sequence;

multiplying the constant modulus signal sequence by a weighting sequence to generate an output signal sequence to cause the output signal sequence to be constrained to a region in a complex plane while in a subband or to have a controlled signal trajectory during transitions between subbands;

providing the sequence of phase values from a plurality of stored phase-value sequence, the input symbol tuple to select the sequence of phase values;

generating a weighting sequence as selected by the input symbol tuple; and shaping an amplitude of the constant modulus signal sequence to a constrained region of the complex plane while in a subband; and transitioning the constant modulus signal sequence to zero or near zero during transitions between subbands, wherein the constrained region of the complex plane comprises an annulus region.

15. A method for generating a waveform for transmission within two or more subbands of a non-contiguous spectrum, the method comprising selecting, with an input symbol tuple, a sequence of phase values, each value of the sequence of phase values representing an instantaneous frequency of a waveform for a signal with a power spectral density substantially constrained to the non-contiguous spectrum;

accumulating the values of the sequence of phase values to generate a phase-sample sequence representing phase samples of a transmit waveform;

performing an exponentiation on the phase-sample sequence to generate a constant modulus signal sequence;

multiplying the constant modulus signal sequence by a weighting sequence to generate an output signal sequence to cause the output signal sequence to be constrained to a region in a complex plane while in a subband or to have a controlled signal trajectory during transitions between subbands;

providing the sequence of phase values from a plurality of stored phase-value sequence, the input symbol tuple to select the sequence of phase values;

generating a weighting sequence as selected by the input symbol tuple; and shaping an amplitude of the constant modulus signal sequence to a constrained region of the complex plane while in a subband; and transitioning the constant modulus signal sequence to zero or near zero during transitions between subbands, wherein the sequence of phase values provided are arranged to establish a phase trajectory for conversion to a Cartesian format to provide the constant modulus signal sequence.

16. A field-programmable gate array (FPGA) configured to generate a single waveform to traverse two or more subbands of a non-contiguous spectrum, the FPGA configured to:

map an input symbol tuple to a sequence of phase values, each value of the sequence of phase values representing an instantaneous frequency of the waveform for a signal with a power spectral density substantially constrained to a current one of the two or more subbands of the non-contiguous spectrum;

accumulate the values of the sequence of phase values to generate a phase-sample sequence representing phase samples of the waveform;

perform an exponentiation on the phase-sample sequence to generate a constant modulus signal sequence; and either:

multiply the constant modulus signal sequence by a weighting sequence to generate an output signal sequence corresponding to the waveform to cause the output signal sequence to be constrained spectrally to a region in a complex plane while in one of the two or more subbands and to have a controlled small signal trajectory during transitions between the two or more subbands; or filter the constant modulus signal sequence to further constrain the output signal sequence to the non-contiguous spectrum to generate an output signal sequence.

17. The FPGA of claim 16, further configured to provide the sequence of phase values from a plurality of stored phase-value sequence, and wherein the symbol tuple selects the sequence of phase values.

18. The FPGA of claim 17, further configured to:

generate a weighting sequence as selected by the input symbol tuple; and shape an amplitude of the constant modulus signal sequence to a constrained region of the complex plane while in a subband and transition the constant modulus signal sequence to zero or near zero during transitions between subbands.

19. A field-programmable gate array (FPGA) configured for non-contiguous spectral-band modulation, the FPGA configured to:

map an input symbol tuple to a sequence of phase values, each value of the sequence of phase values representing an instantaneous frequency of a waveform for a signal with a power spectral density substantially constrained to the non-contiguous spectrum;

accumulate the values of the sequence of phase values to generate a phase-sample sequence representing phase samples of a transmit waveform;

perform an exponentiation on the phase-sample sequence to generate a constant modulus signal sequence; and either:

multiply the constant modulus signal sequence by a weighting sequence to generate an output signal sequence to cause the output signal sequence to be constrained to a region in a complex plane while in a subband or to have a controlled small signal trajectory during transitions between subbands; or filter the constant modulus signal sequence to further constrain the output signal sequence to the non-contiguous spectrum to generate an output signal sequence, wherein the FPGA is further configured to:

provide the sequence of phase values from a plurality of stored phase-value sequence, the input symbol tuple to select the sequence of phase values;

generate a weighting sequence as selected by the input symbol tuple; and shape an amplitude of the constant modulus signal sequence to a constrained region of the complex plane while in a subband and transition the constant modulus signal sequence to zero or near zero during transitions between subbands, wherein the constrained region of the complex plane comprises an annulus region.

20. A field-programmable gate array (FPGA) configured for non-contiguous spectral-band modulation, the FPGA configured to:

map an input symbol tuple to a sequence of phase values, each value of the sequence of phase values representing an instantaneous frequency of a waveform for a signal with a power spectral density substantially constrained to the non-contiguous spectrum;

accumulate the values of the sequence of phase values to generate a phase-sample sequence representing phase samples of a transmit waveform;

perform an exponentiation on the phase-sample sequence to generate a constant modulus signal sequence; and either:

multiply the constant modulus signal sequence by a weighting sequence to generate an output signal sequence to cause the output signal sequence to be constrained to a region in a complex plane while in a subband or to have a controlled small signal trajectory during transitions between subbands; or filter the constant modulus signal sequence to further constrain the output signal sequence to the non-contiguous spectrum to generate an output signal sequence, wherein the FPGA is further configured to:

provide the sequence of phase values from a plurality of stored phase-value sequence, the input symbol tuple to select the sequence of phase values;

generate a weighting sequence as selected by the input symbol tuple; and shape an amplitude of the constant modulus signal sequence to a constrained region of the complex plane while in a subband and transition the constant modulus signal sequence to zero or near zero during transitions between subbands, wherein the sequence of phase values provided are arranged to establish a phase trajectory for conversion to a Cartesian format to provide the constant modulus signal sequence.

* * * * *

UNITED STATES PATENT AND TRADEMARK OFFICE
CERTIFICATE OF CORRECTION

| | | |
|---|---|---|
| PATENT NO. | : 8,923,437 B2 | Page 1 of 1 |
| APPLICATION NO. | : 13/672915 | |
| DATED | : December 30, 2014 | |
| INVENTOR(S) | : Michael Joseph Geile | |

It is certified that error appears in the above-identified patent and that said Letters Patent is hereby corrected as shown below:

Specification

In column 3, line 34, before "208", insert --region--, therefor

In column 7, line 56, before "110", insert --of variable gain component--, therefor

Claims

In column 10, line 21, in Claim 9, delete "durin." and insert --during--, therefor In column 10, line 22, in Claim 9, after "subbands", insert --,--, therefor In column 11, line 53, in Claim 14, after "comprising", insert --:--, therefor Signed and Sealed this
Thirty-first Day of May, 2016

Michelle K. Lee
*Director of the United States Patent and Trademark Office*